2,789,106
Patented Apr. 16, 1957

2,789,106

STABILIZED RUBBERY COMPOSITION

Louis A. Tomka, Westfield, N. J., and Elliott L. Weinberg, Long Island City, N. Y., assignors to Metal & Thermit Corporation, New York, N. Y., a corporation of New Jersey No Drawing. Application January 29, 1954,
Serial No. 407,156

15 Claims. (Cl. 260—45.75)

The present invention relates to the stabilization of elastomers against degradation brought about by aging, especially of rubber compounds of the class consisting of natural rubber and rubbery synthetic polymers. Such properties of the elastomers as elongation, tensile strength, modulus, tackiness, surface crackings, etc., are adversely affected by aging in the absence of stabilizers normally termed rubber anti-oxidants.

It has been found that by incorporating hydrocarbon tin compounds into elastomers that the elastomers become stabilized against the effects of aging. We discovered that a hydrocarbon tin compound having the generalized formula $$R_2SnQ$$

is an effective anti-oxidant for elastomers. In these compounds R is a univalent hydrocarbon radical such as an alkyl, aryl or aralkyl radical and Q is of the group consisting of oxygen or an oxygen-containing inorganic negative radical. Thus the compounds are hydrocarbon tin oxides or salts of these oxides with inorganic, oxygen acids.

Among the hydrocarbon tin derivatives that may be employed are those having methyl, ethyl, butyl, propyl, lauryl, tolyl, phenyl, phenylethyl, diphenyl or benzyl groups attached directly to tin atoms.

Among the oxygenated inorganic salts are nitrates, nitrites, sulfates, sulfites, phosphates, phosphites, borates, arsenates, arsenites. These compounds are extremely effective as rubber-anti-oxidants as demonstrated by their stabilizing ability at exceptionally low concentrations, and are effective at .05% to 5% based on the weight of the rubber with a preferred range of .1 to 1% stabilizer based on the weight of the rubber.

The compounds described herein have the important advantage of being non-staining and thus do not cause discoloration. White stocks which remain white can therefore be manufactured when the compounds we have discovered are used.

The compounds of our invention are effective when used with elastomers and in particular with rubbery materials of the class consisting of (a) natural rubber (b) rubber-like copolymers of 1,3 butadiene and styrene (GR-S type), (c) rubber-like polymers of 1,3 butadiene and acrylonitrile (nitrile type) and (d) rubber-like homopolymers of chloroprene (neoprene type).

The compounds may be milled into the rubbery materials defined above, without other additions, for the purpose of preventing degradation during storage.

More commonly, they will be incorporated with other materials during compounding.

Any suitable compounding formulation may be employed. A specific example of a natural rubber composition, in which these compounds are effective as an anti-oxidant, is as follows:

| | Parts by weight |
|---|---|
| Thin, pale crepe | 100.0 |
| Zinc oxide (lead free) | 5.0 |
| Stearic acid | 1.0 |
| Titanium dioxide (anatase) | 10.0 |
| Insoluble sulfur | 3.0 |
| Benzothiazyl disulfide | 1.0 |
| Tetramethylthiuram disulfide | 0.1 |

To this composition may be added any one of the compounds coming under the general formula set forth above, in proportions of 0.05% to 5% by weight, based on the weight of the rubber ingredient of said composition and preferably in the approximate 0.1% level. This compounded rubber composition containing the anti-oxidant was worked and blended by conventional techniques and vulcanized at 275° F. for twenty minutes in an hydraulic press.

The effectiveness of the compound herein described as anti-oxidants, is indicated by the following test results carried out with the specific rubber composition described above containing anti-oxidant in the amounts and manner shown below.

Example 1. No anti-oxidant
Example 2. 0.25 pt. dibutyl tin oxide
Example 3. 0.25 pt. dilauryl tin oxide
Example 4. 0.25 pt. diphenyl tin oxide
Example 5. 0.50 pt. dibutyl tin hydrogen phosphite
Example 6. 0.50 pt. dimethyl tin sulfite
Example 7. Commercial anti-oxidant The test methods employed to determine the anti-oxidant properties consisted of (1) outdoor exposure and (2) the Oxygen Bomb Test—ASTM Procedure D-572-48. The outdoor exposure test samples were examined for tackiness, surface checking and discoloration. The oxygen bomb test samples were examined for changes in tensile strength, elongation and modulus by means of standard equipment.

The results of the tests on the examples described above were as follows:

*Outdoor exposure test—60 days*

| Sample | Color | Tackiness | Surface Checking |
|---|---|---|---|
| 1 | No discoloration | Pronounced | Pronounced. |
| 2 | do | None | Very slight. |
| 3 | do | do | Do. |
| 4 | do | do | Do. |
| 5 | do | do | Do. |
| 6 | do | do | Do. |
| 7 | Discolored | Slight | Pronounced. |

*Oxygen bomb test—4 days at 70° C.*

| | Modulus (p. s. i.) 200% Elongation | | Tensile Strength (p. s. i.) | | Percent Elongation | |
|---|---|---|---|---|---|---|
| | Orig. | Aged | Orig. | Aged | Orig. | Aged |
| 1 | 270 | 270 | 2,980 | 1,300 | 600 | 500 |
| 2 | 295 | 315 | 3,100 | 2,650 | 600 | 500 |
| 3 | 290 | 300 | 3,050 | 2,550 | 625 | 500 |
| 4 | 290 | 300 | 3,000 | 2,600 | 600 | 520 |
| 5 | 280 | 300 | 3,000 | 2,600 | 600 | 500 |
| 6 | 285 | 305 | 3,100 | 2,700 | 625 | 525 |
| 7 | 250 | 315 | 3,210 | 2,400 | 645 | 525 |

Similar tests on GR-S rubber (1,3 butadiene-styrene) indicate that the stabilization of synthetic rubber with organotin derivatives of the general type described, is just as pronounced as it is in the case of natural rubber.

Although the examples show the stabilizer used with natural rubber crepe and with coagulated GR-S (1,3 butadiene and styrene), incorporation of the stabilizer into latices is possible. The latices would then be processed in the usual manner.

The rubber composition to be stabilized may contain quantities of pigments to impart any desired color or decorative effect to the final product. The stabilizer will cause the rubber composition to maintain its color whether it is black, white or any other color.

While the invention has been described with reference to various examples and embodiments, it will be apparent to those skilled in the art that various modifications may be made, and equivalents substituted therefor, without departing from the principles and true nature of the invention.

What is claimed is:

1. A rubber composition comprising as a basic ingredient a rubbery polymer selected from the class consisting of natural rubber, copolymers of 1,3 butadiene and styrene and copolymers of 1,3 butadiene and acrylonitrile and containing a stabilizing amount of a hydrocarbon tin compound of the type formula $$R_2SnQ$$

wherein R is a univalent hydrocarbon radical bonded to tin and Q is selected from the class consisting of oxygen and oxygen-containing inorganic negative radicals bonded to tin through oxygen.

2. A rubber composition as described in claim 1 wherein said composition is cured.

3. A rubber composition as described in claim 1 wherein said composition contains pigments.

4. A method of treating a rubber whose polymer chains are made up of carbon atoms which comprises curing the compound in the presence of a stabilizing amount of a hydrocarbon tin compound of the type formula $$R_2SnQ$$

wherein R is a univalent hydrocarbon radical and Q is selected from the class consisting of oxygen and oxygen-containing inorganic negative radicals bonded to tin through oxygen.

5. A method of treating a rubber composition comprising as a basic ingredient a rubbery polymer selected from the class consisting of natural rubber, copolymers of 1,3 butadiene and styrene, and copolymers as 1,3 butadiene and acrylonitrile which comprises curing said rubber composition in the presence of a stabilizing amount of a hydrocarbon tin compound of the the type formula $$R_2SnQ$$

wherein R is a univalent hydrocarbon radical and Q is selected from the class consisting of oxygen and oxygen-containing inorganic negative radicals bonded to tin through oxygen.

6. A rubber composition according to claim 1, wherein the stabilizer is present in the amount of 0.05% to 5% by weight of rubber ingredient.

7. A rubber composition according to claim 1, wherein R is alkyl and the rubbery polymer is a copolymer of 1,3 butadiene and styrene.

8. A rubber composition according to claim 1, wherein R is aryl and the rubbery polymer is a copolymer of 1,3 butadiene and styrene.

9. A rubber composition according to claim 1, wherein the hydrocarbon tin compound is dibutyl tin oxide and the rubbery polymer is a copolymer of 1,3 butadiene and styrene.

10. A rubber composition according to claim 1, wherein the hydrocarbon tin compound is dilauryl tin oxide and the rubbery polymer is a copolymer of 1,3 butadiene and styrene.

11. A rubber composition according to claim 1, wherein the hydrocarbon tin compound is diphenyl tin oxide and the rubbery polymer is a copolymer of 1,3 butadiene and styrene.

12. A rubber composition according to claim 1, wherein the hydrocarbon tin compound is dibutyl tin hydrogen phosphite and the rubbery polymer is a copolymer of 1,3 butadiene and styrene.

13. A rubber composition according to claim 1, wherein the hydrocarbon tin compound is dimethyl tin sulfite and the rubbery polymer is a copolymer of 1,3 butadiene and styrene.

14. A method according to claim 5, wherein R is alkyl and the rubbery polymer is a copolymer of 1,3 butadiene and styrene.

15. A method according to claim 5, wherein R is aryl and the rubbery polymer is a copolymer of 1,3 butadiene and styrene.

References Cited in the file of this patent

UNITED STATES PATENTS

| 2,267,777 | Yngve | Dec. 30, 1941 |
| 2,307,092 | Yngve | Jan. 5, 1943 |
| 2,476,661 | Hart | July 19, 1949 |
| 2,641,596 | Leistner et al. | June 9, 1953 |